United States Patent [19]
Nakai et al.

[11] Patent Number: 5,844,624
[45] Date of Patent: Dec. 1, 1998

[54] TELEVISION RECEIVER

[75] Inventors: Kenzo Nakai; Yukihiko Yamamoto, both of Kanagawa, Japan

[73] Assignee: Sony Corporation, Tokyo, Japan

[21] Appl. No.: 665,881

[22] Filed: Jun. 19, 1996

[30] Foreign Application Priority Data

Jun. 20, 1995 [JP] Japan .................................. 7-153038

[51] Int. Cl.$^6$ .................................................. H04N 5/46
[52] U.S. Cl. ........................ 348/558; 348/913; 348/555; 348/441
[58] Field of Search ................................ 348/558, 913, 348/556, 555, 448, 449, 663, 630, 631, 604; H04N 5/46

[56] References Cited

U.S. PATENT DOCUMENTS

| | | | |
|---|---|---|---|
| 5,291,295 | 3/1994 | Srivastava | 348/555 |
| 5,481,315 | 1/1996 | Matsunaya | 348/566 |
| 5,486,871 | 1/1996 | Filliman et al. | 348/556 |
| 5,629,776 | 5/1997 | Layoni | 348/556 |
| 5,659,369 | 8/1997 | Imaiida | 348/558 |

*Primary Examiner*—Andrew I. Faile
*Assistant Examiner*—Vivek Srivastavia
*Attorney, Agent, or Firm*—Frommer Lawrence & Haug, LLP; William S. Frommer

[57] ABSTRACT

A television receiver includes a picture-display-region discriminating means for discriminating whether or not any picture is displayed on a specific region on a screen of the television receiver, by utilizing a luminance signal of a composite video signal which is received by the television receiver and corresponds to the specific region. A signal in a frequency band which is unnecessary for the video signal is eliminated, and then it is discriminated whether or not any picture is displayed on the specific region, by utilizing the luminance signal and a carrier chrominance signal contained in the video signal.

6 Claims, 5 Drawing Sheets

TELEVISION RECEIVER

BACKGROUND OF THE INVENTION

1. Field of the Invention

The present invention relates to a television receiver and particularly to a discriminating circuit for discriminating a video signal corresponding to a predetermined region on a picture screen to automatically change and set a picture screen size.

2. Description of the Related Art

An aspect ratio of the present standard television system, e.g., an aspect ratio of an NTSC system is determined as 4:3 (a value of the ratio is 1.33). An aspect ratio of a high-definition television (HDTV) system is determined as 16:9 (a value of the ratio is 1.78). Comparison of these aspect ratios reveals that the high-definition television system provides a picture screen whose frame width is longer as compared with that of the NTSC system.

Standardization of a hardware such as a picture screen size or the like allows a television receiver to be versatile.

When a software such as a movie or the like is displayed on a picture screen of the television receiver with corresponding to the above standard, a software having a rectangular picture, such as a picture of a Vista Vision size (a value of its aspect ratio is 1.85) and a picture of a Cinema Scope size (a value of its aspect ratio is 2.35), is displayed as a so-called letter-box picture without edges of the rectangular picture of the software being trimmed. Further, a software set so as to have a rectangular picture to be displayed on the picture screen with an aspect ratio of 4:3 (which is the same as that of the NTSC system) and a broadcasting program set so as to have a rectangular picture obtained by converting a HDTV system signal into an NTSC system signal are increased.

When a viewer watches a software or a broadcasting program having a rectangular picture on a so-called wide screen television receiver having a rectangular screen size as a hardware, the viewer operates a display mode button provided in a remote controller or the like and changes a display mode after actually watching a picture displayed on the television receiver, thereby setting and changing a standard or rectangular screen size.

However, it is only after the viewer watches the picture displayed on the television receiver that he can determine which display mode he selects. Moreover, it is not always easy for the viewer to select an optimum display mode in response to a software and a program, which provides the problem of such operation's spoiling the viewer's interest.

In order to solve this problem, there may be employed a method of inserting an identification information indicative of a screen size into a vertical blanking period on the broadcasting side or the software production side. A satisfactory effect of this method cannot be achieved until all of the broadcasting side or the software provider side employ such system.

In order to solve the above problems, the same assignee has already disclosed an invention in Japanese patent application No. 214209/1994 (filed on Aug. 16, 1994). According to the invention of this application, predetermined specific regions on a picture screen are set as picture detection regions and video signals corresponding to the respective specific regions are detected, thereby a display mode being automatically discriminated and selected.

Figure 1:
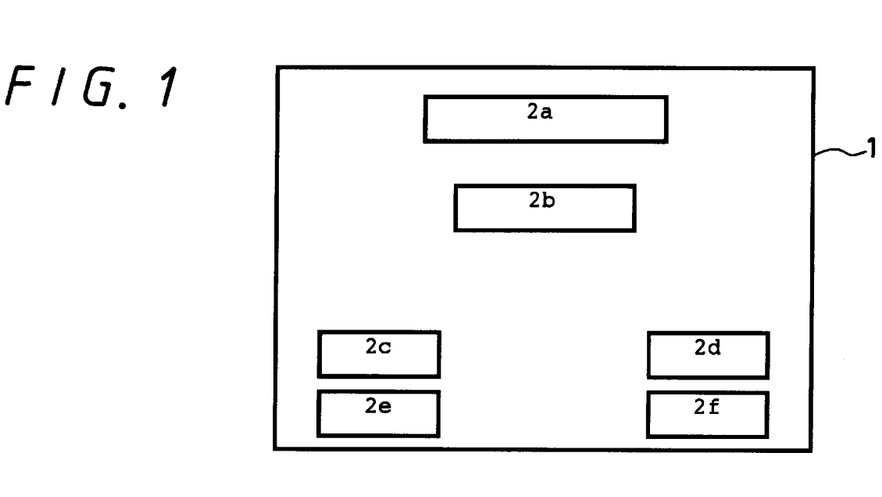
FIG. 1 is a diagram used to explain a picture detection region of a television receiver.

Specifically, as shown in FIG. 1, six picture detection regions 2a to 2f are set on a picture screen 1 of a television receiver on the assumption that electron beams scan the whole picture screen 1. The respective picture detection regions 2a to 2f are determined in consideration of a picture size, e.g., they are determined so as to correspond to portions where no picture is displayed when rectangular letter-box pictures of a software and pictures of various picture sizes of Vista Vision size, Cinema Scope size and so on are displayed on the screen 1. For example, when a picture of the NTSC system having an aspect ratio of 4:3 is displayed on the screen 1, no picture is displayed on the picture detection region 2a. This method is described in detail in the above application filed by the same assignee and hence will not be described in this application.

In order to detect whether or not there are the video signals, i.e., pictures corresponding to the divided picture detection regions 2a to 2f, it is sufficient to discriminate whether a luminance signal (Y signal) of the video signal is at a black level or a white level.

A picture-display-region discriminating circuit 3 discriminates whether or not a picture is displayed on each of the picture detection regions 2a to 2f, by discriminating the black level or the white level at each picture detection region.

Figure 2:
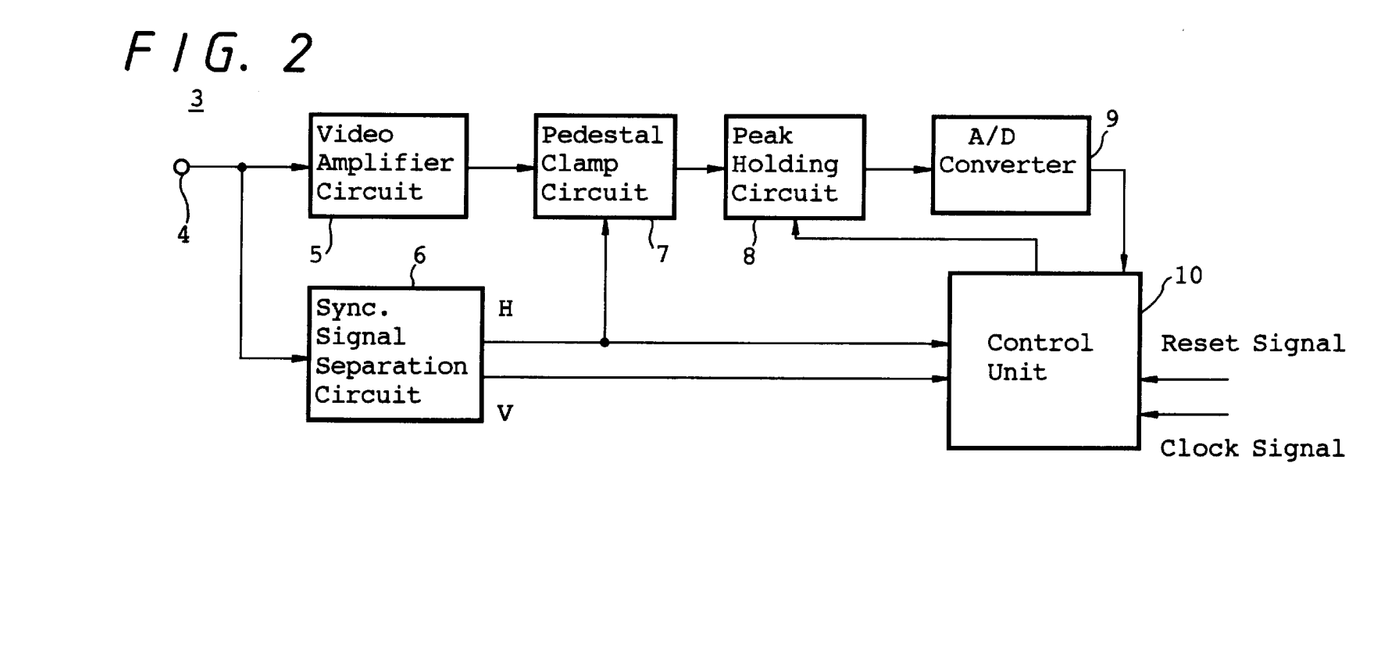
FIG. 2 is a diagram schematically showing a discriminating circuit for the picture detection region of the television receiver.

As shown in FIG. 2, the picture-display-region discriminating circuit 3 includes a composite video signal input terminal 4, a video amplifier circuit 5, a synchronizing signal separation circuit 6, a pedestal clamp circuit 7, a peak holding circuit 8, an A/D converter 9, and a control unit 10.

A detected composite video signal is supplied through the composite video signal input terminal 4 to the video amplifier circuit 5. The video amplifier circuit 5 amplifies the supplied video signal so that the composite video signal should have a magnitude required as a signal to be input to a picture tube. The video amplifier circuit 5 supplies the amplified video signal to the pedestal clamp circuit 7.

The composite video signal is also supplied from the composite video signal input terminal 4 to the synchronizing signal separation circuit 6. The synchronizing signal separation circuit 6 separates a horizontal synchronizing signal (H pulse signal) and a vertical synchronizing signal (V pulse signal) from the supplied composite video signal. The synchronizing signal separation circuit 6 supplies the H pulse signal to the pedestal clamp circuit 7 and the control unit 10 to which the V pulse signal is also supplied.

When the video amplifier circuit 5 amplifies the video signal, the video signal has pedestal levels which are different depending upon whether the picture obtained from the video signal is a dark picture or a bright picture. The pedestal clamp circuit 7 forcibly clamps the pedestal levels of the video signal supplied from the video amplifier circuit 5 at the same level, and supplies the video signal to the peak holding circuit 8.

Based on a detection pulse signal from the control unit 10, the peak holding circuit 8 detects peak values of the video signals corresponding to the picture detection regions 2a to 2f. The peak holding circuit 8 supplies its output signal to an A/D converter 9.

The A/D converter 9 converts the video signals indicative of black levels and white levels corresponding to the picture detection regions 2a to 2f into the digital signals. The A/D converter 9 supplies the digital signals to the control unit 10.

The control unit 10 has a function of detecting existence or absence of a picture displayed on each of the picture display regions 2a to 2f based on the digital signal indicative of the black or white level to thereby automatically switch the display mode to a display mode for one of pictures of various kinds, e.g., a standard picture, a rectangular picture and so on. The control unit 10 is supplied with the H pulse signal and the V pulse signal from the synchronizing signal separation unit 6 at its count input unit. The control unit 10 supplies the detection pulse signal to the peak holding circuit 8. The control unit 10 is supplied with a reset signal and a clock signal at its reset and clock inputs.

Figure 3:
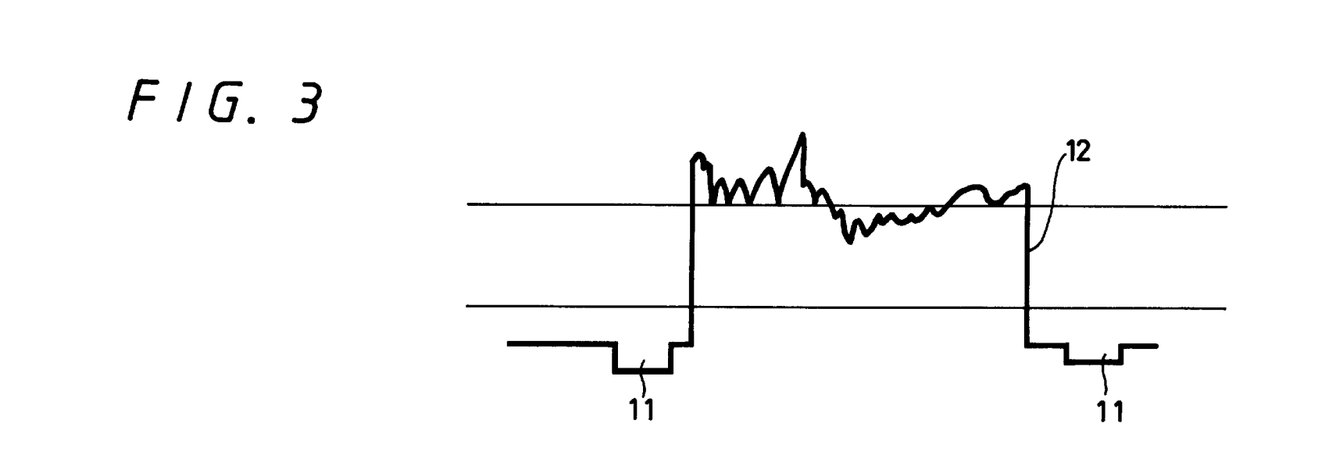
FIG. 3 is an explanatory diagram showing threshold values of a black level and a white level of a video signal.

As shown in FIG. 3, if a level of a luminance signal 12 between horizontal synchronizing signals 11 of the video signal corresponding to one of the picture detection region 2a to 2f is at a black level, then the picture-display-region discriminating circuit 3 having such arrangement determines that any picture is not to be displayed on the picture display region. Thus, it is possible for the picture-display-region discriminating circuit 3 to automatically set the screen size to an optimum screen size for a standard size screen with an aspect ratio of 4:3, a rectangular HDTV-system screen with an aspect ratio of 16:9 and so on. This point is also described in detail in the above Japanese patent application filed by the same assignee and hence will not be described in this application.

However, when it is discriminated as described above whether or not any picture is displayed on the picture detection region, the video signal corresponding to the region where no picture is to be displayed, more particularly, the black level of the luminance signal thereof must be detected with accuracy which is basically different from an accuracy in detection of the black level required when a color picture is formed on a fluorescent screen of the picture tube of the television receiver.

Therefore, when the picture-display-region discriminating circuit 3 detects whether or not there is any video signal corresponding to the region where no picture is to be displayed, as shown in FIG. 3, if the level of the luminance signal 12 between the horizontal synchronizing signals 11 of the video signal is at the black level, then the picture-display-region discriminating circuit 3 determines that there is no picture on the region. Thus, the picture-display-region discriminating circuit 3 determines whether or not the region is the region where no picture is to be displayed.

However, since the picture-display-region discriminating circuit 3 employs only the luminance signal (Y signal) 12 of the composite video signal for the determination of the region where no picture is displayed, even if the luminance signal 12 corresponding to the region where no picture is to be displayed is not at the black level and it is at a level lower than a set level, the picture-display-region discriminating circuit 3 determines that the level is at the black level.

If the picture display region is discriminated by employing not only the luminance signal 12 but also a carrier chrominance signal (C signal), then the picture-display-region discriminating circuit 3 must be improved so as to utilize the carrier chrominance signal upon the determination. This improvement of the picture-display-region discriminating circuit 3 inevitably requires change of ICs and the like therein and addition of a peripheral circuit thereto, hence leading to increase of the costs thereof which is not desirable.

Accordingly, as described above, when discriminating whether or not there is any picture on each of the picture detection regions 2a to 2f, the picture-display-region discriminating circuit 3 has the problems to be solved.

SUMMARY OF THE INVENTION

In view of such aspects, it is an object of the present invention to provide a television receiver having a picture-display-region discriminating means which discriminates whether or not any picture is displayed on a picture detection region on a picture screen of the television receiver, by utilizing a luminance signal and a carrier chrominance signal of a video signal.

According to the present invention, the television receiver includes a picture-display-region discriminating means for discriminating whether or not any picture is displayed on a specific region on a screen of the television receiver, by utilizing the luminance signal of the video signal corresponding to the specific region. It is discriminated whether or not any picture is displayed on the specific region, by utilizing the luminance signal and the carrier chrominance signal contained in the video signal.

DESCRIPTION OF THE PREFERRED EMBODIMENTS

Picture-display-region discriminating circuits of a television receiver according to first to fifth embodiments of the present invention will hereinafter be described with reference to the accompanying drawings. A synchronizing signal separation circuit 6, a pedestal clamp circuit 7, a peak holding circuit 8 and so on provided in each of the picture-display-region discriminating circuits according to the embodiments of the present invention have the same arrangements and functions as those of the synchronizing signal separation circuit 6, the pedestal clamp circuit 7, the peak holding circuit 8 and so on of the picture-display-region discriminating circuit 3 shown in FIG. 2. Therefore, the synchronizing signal separation circuit 6, the pedestal clamp circuit 7, the peak holding circuit 8 and so on corresponding to those shown in FIG. 2 are marked with the same reference numerals. In each of the following embodiments, a circuit for separating a luminance signal (Y signal) and a carrier chrominance signal (C signal) from an input composite video signal and an A/D converter for converting the separated luminance signal and the carrier chrominance signal into digital data will be described.

Figure 4:
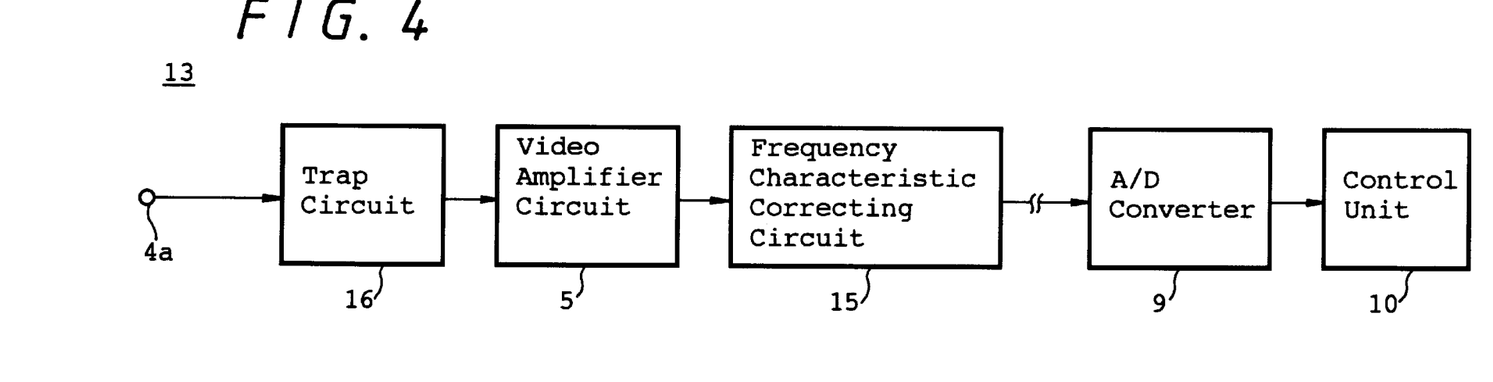
FIG. 4 is a block diagram schematically showing a picture-display-region discriminating circuit of a television receiver according to a first embodiment of the present invention which includes a trap circuit for separating a luminance signal and a carrier chrominance signal.

As shown in FIG. 4, a picture-display-region discriminating circuit 13 of the television receiver according to the first embodiment of the present invention employs a trap circuit 14 for effecting trap on the input composite video signal in order to employ not only the luminance signal but also the carrier chrominance signal for discrimination of a picture detection region on the screen of the television receiver.

The trap circuit 14 for effecting the trap eliminates an audio signal from a video signal channel and is called a rejector. The trap circuit 14 may be formed of an inductive-capacitance (LC) element or may employ a ceramic resonant element such as a piezo resonator, a bulk filter or the like. The trap circuit 14 employs a surface acoustic wave (SAW) filter as a trap filter.

The trap filter formed of the SAW filter and an IC is arranged such that when an input-side comb-like electrode is applied with a signal voltage, the comb-like electrode mechanically vibrates and its vibration is transmitted to an output-side comb-like electrode in the form of a surface wave. Further, the trap circuit 14 can substantially perfectly separate the luminance signal and the carrier chrominance signal by eliminating a proper frequency band, e.g., a frequency band between those of the luminance signal and the carrier chrominance signal shown in FIG. 5.

As shown in FIG. 4, the picture-display-region discriminating circuit 13 separates the luminance signal (Y signal) and the carrier chrominance signal (C signal) by utilizing the trap circuit 14 having the above characteristics, and includes the trap circuit 14, a video amplifier circuit 5 and a filter-characteristic correcting circuit 15 which are connected in series.

Figure 5:
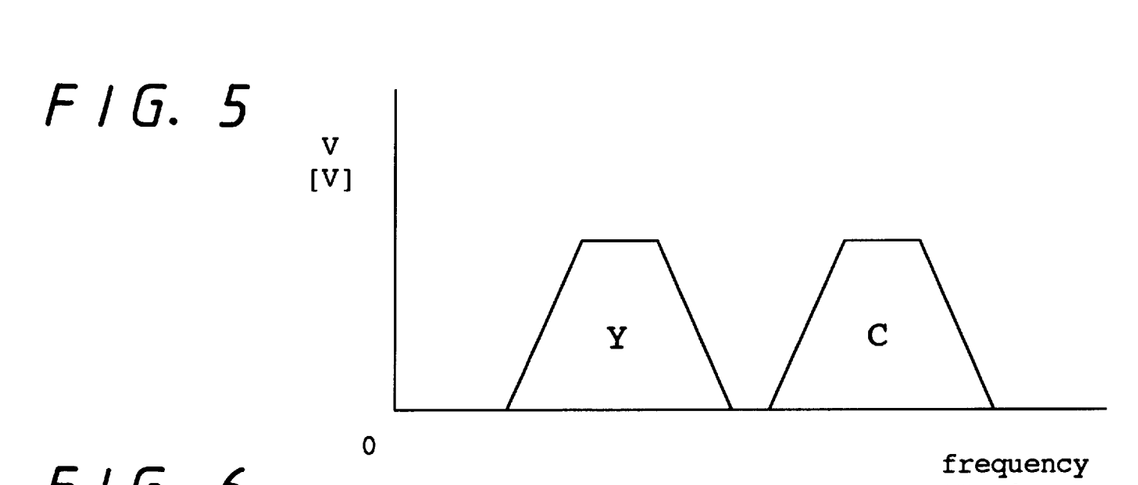
FIG. 5 is a graph showing a frequency band of a separate luminance signal and a frequency band of a separate carrier chrominance signal according to the first embodiment.

In the picture-display-region discriminating circuit 13 having such arrangement, the composite video signal supplied to a composite video signal input terminal 4a is input to the trap circuit 14. As shown in FIG. 5, the trap circuit 14 separates a frequency band of the luminance signal and a frequency band of the carrier chrominance signal by eliminating a proper frequency band between them and obtains the luminance signal having a predetermined frequency band and the carrier chrominance signal having a predetermined frequency band, and also eliminates frequency bands which are not required for the video signal, e.g., frequency bands of the audio signal and so on. This processing for eliminating unnecessary frequency bands results in elimination of a noise or the like in the frequency bands. The elimination of the noise allows an accurate operation of an A/D converter 9 for converting the analog video signals into digital data.

The trap circuits 14 supplies to the video amplifier circuit 5 the video signal where the frequency bands of the luminance and carrier chrominance signal are separated by eliminating the predetermined bands. The video amplifier circuit 5 amplifies the video signal with the separate frequency bands of the luminance signal and the carrier chrominance signal and supplies the amplified video signal to a frequency characteristic correcting circuit 15. Since the trap circuit 14 eliminates the signal in the frequency band which is not required for the video signal but attenuates the signal in the frequency bands required for the video signal at the same time, the frequency characteristic correcting circuit 15 has a function to correct the attenuated signal in the necessary frequency band. Then, the picture-display-region discriminating circuit 13 supplies the video signal to the pedestal clamp circuit 7.

A reference level of the video signal with the separate frequency bands of the luminance signal and the carrier chrominance signal is set by a pedestal clamp circuit 7 with reference to timings of the synchronizing signal (H pulse signal) from a synchronizing signal separation circuit 6 shown in FIG. 2. Thereafter, the video signal is supplied through a peak holding circuit 8 to the A/D converter 9. The A/D converter 9 converts the supplied video signal into digital data and supplies the digital data to a control unit 10 formed of a microcomputer.

Thus, based on the digital data indicative of the separate luminance signal and the separate carrier chrominance signal, the control unit 10 can determine whether or not any picture is displayed on each of the picture detection regions, shown in FIG. 1, of the television receiver, by utilizing not only the luminance signal but also the carrier chrominance signal. Specifically, the control unit 10 can carry out the above determination not only by discriminating the black level or the white level of the luminance signal but also by discriminating the carrier chrominance signal. In other words, the control unit 10 can make the above determination not only by utilizing a threshold value of the black level or the white level but also utilizing the carrier chrominance signal, which allows the control unit 10 to accurately determine whether or not any picture is displayed on each of the picture detection portions.

Figure 6:
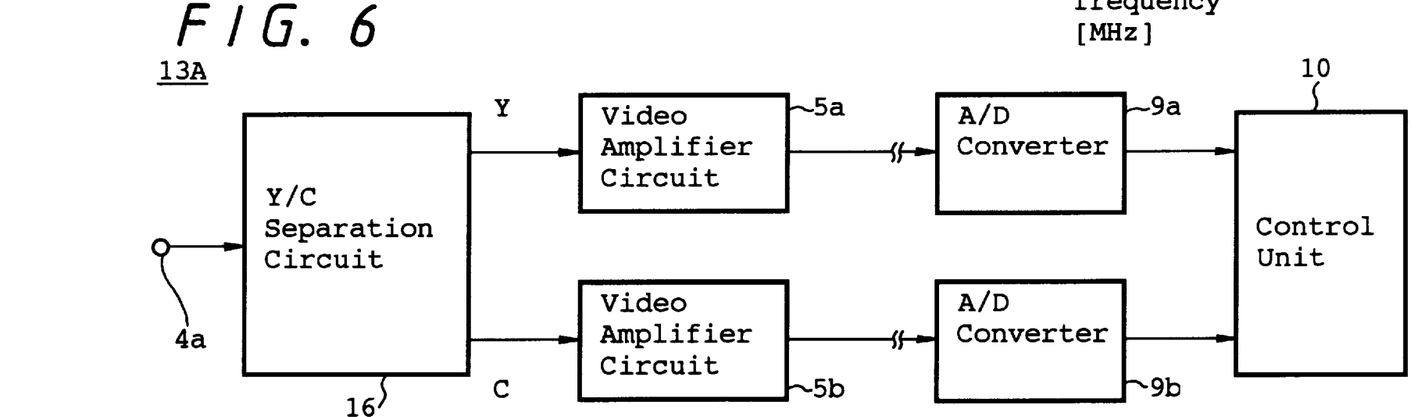
FIG. 6 is a block diagram schematically showing a picture-display-region discriminating circuit of a television receiver according to a second embodiment of the present invention.

A picture-display-region discriminating circuit 13A according to the second embodiment of the present invention will be described with reference to FIG. 6. As shown in FIG. 6, the picture-display-region discriminating circuit 13A includes a Y/C separation circuit 16, two video amplifier circuits 5a, 5b, and two A/D converters 9a, 9b. As shown in FIG. 6, a composite video signal input to the composite video signal input terminal 4a is supplied to the Y/C separation circuit 16. The Y/C separation circuit 16 separates the luminance signal (Y signal) and the carrier chrominance signal (C signal) from the composite video signal and supplies them to the video amplifier circuits 5a, 5b, respectively. The video amplifier circuits 5a, 5b respectively amplify the luminance signal and the carrier chrominance signal and supply them to the A/D converters 9a, 9b, respectively. The A/D converts 9a, 9b respectively convert the supplied luminance signal and carrier chrominance signal into digital data and supply them to the control unit 10.

Since the picture-display-region discriminating circuit 13A is thus arranged, it is possible to control the luminance signal and the carrier chrominance signal independently, which allows the accurate luminance and carrier chrominance signals to be obtained. Other arrangements and so on according to this embodiment are the same as those of the first embodiment and hence will not be described.

Figure 7:
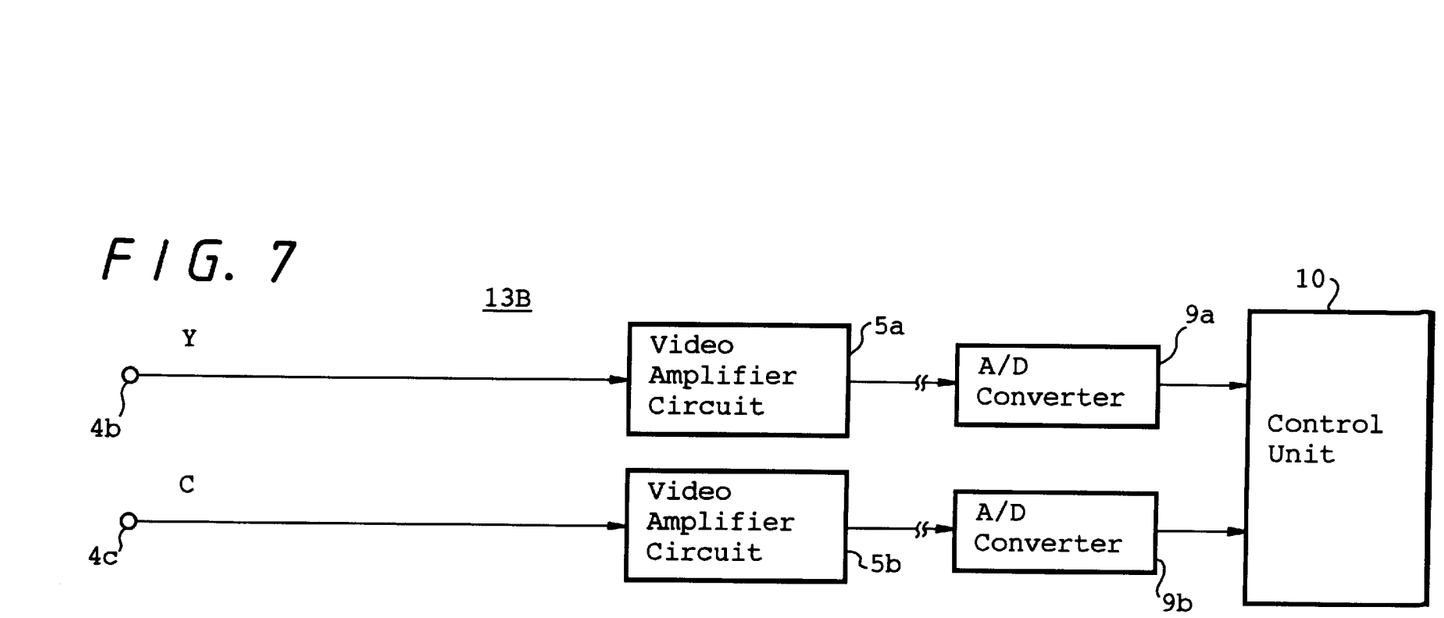
FIG. 7 is a block diagram schematically showing a picture-display-region discriminating circuit of a television receiver according to a third embodiment of the present invention.

A picture-display-region discriminating circuit 13B according to the third embodiment of the present invention will be described with reference to FIG. 7. As shown in FIG. 7, the picture-display-region discriminating circuit 13B includes the two video amplifier circuits 5a, 5b and two A/D converts 9a, 9b but does not include the Y/C separation circuit used in the second embodiment. In this embodiment, the luminance signal and the carrier chrominance signal are already separated and input to a luminance signal input terminal 4b and a carrier chrominance signal input terminal 4c, respectively. The luminance signal and the carrier chrominance signal are supplied therefrom to the video amplifier circuits 5a, 5b, respectively. The video amplifier circuits 5a, 5b respectively amplify the luminance signal and the carrier chrominance signal and supply them to the A/D converters 9a, 9b. The A/D converts 9a, 9b respectively convert the supplied luminance signal and carrier chrominance signal into digital data and supply them to the control unit 10.

Since the picture-display-region discriminating circuit 13B is thus arranged, the circuit for separating the luminance signal and the carrier chrominance signal can be omitted, and it is possible to control the luminance signal and the carrier chrominance signal independently, which allows the accurate luminance and carrier chrominance signals to be obtained. Other arrangements and so on according to this embodiment are the same as those of the first embodiment and hence will not be described.

Figure 8:
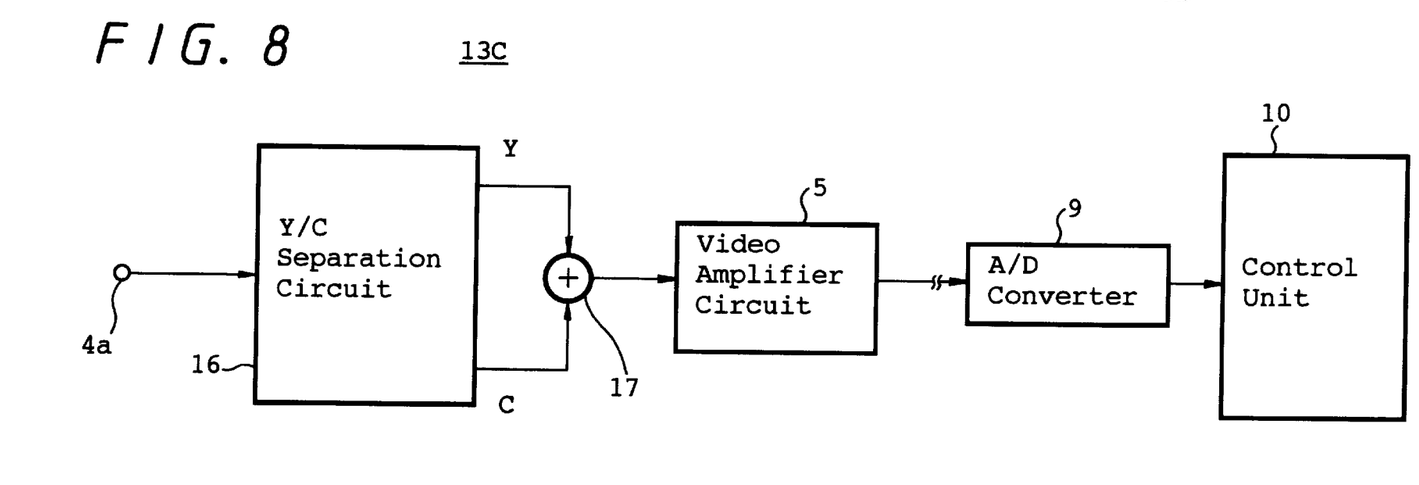
FIG. 8 is a block diagram schematically showing a picture-display-region discriminating circuit of a television receiver according to a fourth embodiment of the present invention.

A picture-display-region discriminating circuit 13C according to the forth embodiment of the present invention will be described with reference to FIG. 8. As shown in FIG. 8, the picture-display-region discriminating circuit 13C includes the Y/C separation circuit 16, an adder 17, the video amplifier circuit 5, and the A/D converter 9. As shown in FIG. 8, the composite video signal input to the composite video signal input terminal 4a is supplied to the Y/C separation circuit 16. The Y/C separation circuit 16 separates the luminance signal and the carrier chrominance signal from the composite video signal and supplies them to the adder 17. The adder 17 adds the luminance signal and the carrier chrominance signal and supplies the added signal to the video amplifier circuit 5. The video amplifier circuit 5 amplifies the supplied video signal and supplies the amplified video signal to the A/D converter 9. The A/D converter 9 converts the supplied video signal into digital data, and supplies the digital data to the control unit 10.

Since the picture-display-region discriminating circuit 13C is thus arranged, the luminance signal and the carrier chrominance signal are accurately separated and then added. Therefore, it is possible to obtain the precise luminance signal and the precise carrier chrominance signal under the accurate control. Other arrangements and so on according to this embodiment are the same as those of the first embodiment and hence will not be described.

Figure 9:
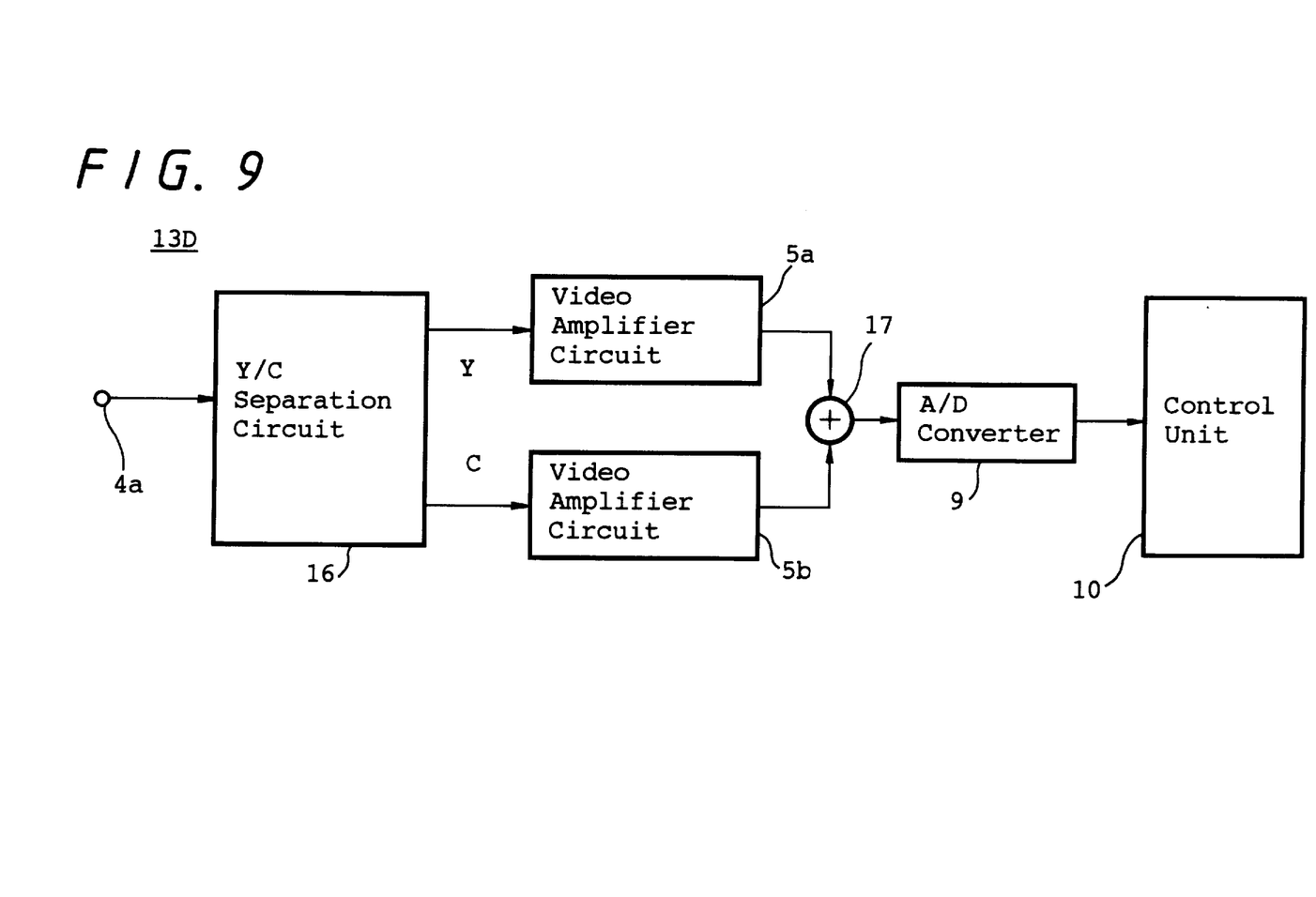
FIG. 9 is a block diagram schematically showing a picture-display-region discriminating circuit of a television receiver according to a fifth embodiment of the present invention.

A picture-display-region discriminating circuit 13D according to the fifth embodiment of the present invention will be described with reference to FIG. 9. As shown in FIG. 9, the picture-display-region discriminating circuit 13D includes the Y/C separation circuit 16, the two video amplifier circuit 5a, 5b, the adder 17 and the A/D converter 9. As shown in FIG. 9, the composite video signal input to the composite video signal input terminal 4a is supplied to the Y/C separation circuit 16. The Y/C separation circuit 16 separates the luminance signal and the carrier chrominance signal from the composite video signal and supplies them to the video amplifier circuits 5a, 5b, respectively. The video amplifier circuits 5a, 5b respectively amplify the luminance signal and the carrier chrominance signal and supply them to the adder 17. The adder 17 adds the luminance signal and the carrier chrominance signal and supplies the added signal to the A/D converter 9. The A/D converter 9 converts the supplied video signal into digital data, and supplies the digital data to the control unit 10.

Since the picture-display-region discriminating circuit 13D is thus arranged, the luminance signal and the carrier chrominance signal are accurately separated, amplified and then added. Therefore, it is possible to obtain the precise luminance signal and the precise carrier chrominance signal under the accurate control. Other arrangements and so on according to this embodiment are the same as those of the first embodiment and hence will not be described.

As described above, according to the first to fifth embodiments of the present invention, since the frequency bands which are unnecessary for the video signal are eliminated from the frequency band of the composite video signal, it is possible to prevent the noise resulting from the unnecessary frequency band from being produced, and it is possible to accurately separate the luminance signal and the carrier chrominance signal. Therefore, since the luminance signal and the carrier chrominance signal are separated and then utilized for the discrimination of the picture display region, it is possible to precisely determine whether or not any picture is displayed on each of the picture detection regions, based on the digital data obtained from the separate luminance signal and the separate carrier chrominance signal.

As described above, according to the picture-display-region discriminating circuit of the television receiver of the present invention, it is possible to precisely extract the necessary video signal by eliminating the frequency bands other than that of the video signal, and it is possible to determine whether or not any picture is displayed on each of the picture display regions, by discriminating not only the luminance signal but also the carrier chrominance signal. Therefore, it is possible to determine the black level and the white level of the video signal corresponding to the each of the picture display regions under the accurate control.

The present invention is not limited to the above embodiments and can be applied to an arrangement for eliminating the frequency bands other than that of the video signal and for determining whether or not any picture is displayed on each of the picture display regions by discriminating not only the luminance signal but also the carrier chrominance signal.

Having described preferred embodiments of the present invention with reference to the accompanying drawings, it is to be understood that the present invention is not limited to the above-mentioned embodiments and that various changes and modifications can be effected therein by one skilled in the art without departing from the spirit or scope of the present invention as defined in the appended claims.

What is claimed is:

1. A television receiver comprising
   a picture display region discriminating means for discriminating whether or not there is any picture on a specific region on a screen of said television receiver by utilizing a luminance signal of a video signal corresponding to said specific region, wherein it is discriminated whether or not there is any picture, by utilizing the luminance signal and a carrier chrominance signal contained in said video signal.

2. A television receiver according to claim 1, wherein said luminance signal and said carrier chrominance signal are utilized for said discrimination after a received video signal is subjected to trap and then amplified.

3. A television receiver according to claim 1, wherein said luminance signal and said carrier chrominance signal are separated from a received video signal and then amplified independently, thereafter being utilized for said discrimination.

4. A television receiver according to claim 1, wherein said luminance signal and said carrier chrominance signal are utilized for said discrimination by independently amplifying a luminance signal and a carrier chrominance signal which are previously separated from a received video signal.

5. A television receiver comprising a picture display region discriminating means for discriminating whether or not there is any picture on a specific region on a screen of said television receiver by utilizing a luminance signal and a carrier chrominance signal contained in said video signal corresponding to said specific region, wherein said luminance signal and said carrier chrominance signal are utilized for said discrimination after they are separated from a received video signal, added and amplified.

6. A television receiver comprising a picture display region discriminating means for discriminating whether or not there is any picture on a specific region on a screen of said television receiver by utilizing a luminance signal and a carrier chrominance signal contained in said video signal corresponding to said specific region, wherein said luminance signal and said carrier chrominance signal are utilized for said discrimination after they are separated from a received video signal, amplified independently and added.

* * * * *